United States Patent [19]

Matzen

[11] 3,731,119
[45] May 1, 1973

[54] STATE RETENTION CIRCUIT FOR RADIATION HARDENED FLIP FLOP

[75] Inventor: Walter T. Matzen, Richardson, Tex.

[73] Assignee: The United States of America as represented by the Secretary of the Air Force

[22] Filed: Nov. 10, 1971

[21] Appl. No.: 197,385

Related U.S. Application Data

[63] Continuation-in-part of Ser. No. 828,172, May 27, 1969, abandoned.

[52] U.S. Cl..............307/291, 250/83.3 R, 307/202, 307/311
[51] Int. Cl............................................H03k 3/286
[58] Field of Search.....................307/308, 311, 289, 307/291, 202; 250/108 R

[56] References Cited

UNITED STATES PATENTS 3,409,839   11/1968   Crowe...................................330/33

Primary Examiner—John Zazworsky
Attorney—Harry A. Herbert, Jr. et al.

[57] ABSTRACT

A state retention apparatus for a radiation hardened flip flop for protecting the logic circuitry from radiation induced photocurrents. During periods of transient ionizing pulses of a predetermined magnitude, a switching function is performed to protect the logic state of the flip-flop and after the transients have decayed below a predetermined level, the flip-flop is returned to normal operation.

3 Claims, 11 Drawing Figures

INVENTOR.
WALTER F. MATZEN
BY
ATTORNEYS

WALTER T. MATZEN
Harry A. Herbert Jr
George Fine
ATTORNEYS

STATE RETENTION CIRCUIT FOR RADIATION HARDENED FLIP FLOP

CROSS REFERENCE TO RELATED APPLICATION

The present patent application is a continuation-in-part of U.S. Pat. Application Ser. No. 828,172 filed 27 May 1969 now abandoned, entitled "State Retention Circuit for Radiation Hardened Flip-Flop" by Walter T. Matzen.

BACKGROUND OF THE INVENTION

The effect of transient gamma radiation in semiconductor devices is to generate hole electron pairs in the semiconductor material. The carriers which move by diffusion and drift to the junctions produce transient photocurrents. The current components which enter the base region are called the primary photocurrents. The major component of primary photocurrent is that produced in the collector region and the transition region of the collector base junction. The emitter component of primary photocurrent is normally much smaller due to the short diffusion length in the emitter.

The primary photocurrent entering the base region produces an amplified component of current called the secondary photocurrent. The magnitude of the transient photocurrents increases with ionizing rate. For high radiation rates, the currents may be of sufficient magnitude to produce error signals in a circuit or render it inoperative.

Prior art radiation hardened circuits were designed to minimize the effects of transient photocurrents by utilizing the devices with small junction areas. The lifetime of the collector junction may be minimized by use of low resistivity material and gold doping. The adverse effects of ionizing radiation may also be minimized by using low impedance circuits and compensation techniques. These compensation techniques employ auxiliary junctions to counteract the effect of photocurrents generated within the circuits. Thus, two extra compensation diodes are included in the collector and base circuits respectively which generate photocurrents matching that of the collector base junction and provide a continuous path for the primary photocurrent. Assuming perfect matching, no base current is produced and the secondary photocurrent is suppressed.

This prior art compensation technique may be effectively utilized at transient ionizing radiation rates up to $10^{11}$ rad/sec. At substantially higher radiation rates, the prior art has not effectively provided protection for logic circuitry.

SUMMARY OF THE INVENTION

The present invention provides a state retention apparatus for protecting the logic circuitry of a flip-flop from radiation-induced photocurrents. The state retention apparatus utilizes semiconductor devices which upon being subjected to ionizing radiation become photocurrent generators and when coupled with level sensitive switching circuitry, switch the flip-flop to a disenabled state. While the flip-flop is held in the disabled state, the flip-flop is uneffected by any spurious or radiation-generated signals which may be present and its logic state prior to disenabling will be retained. When the magnitude of the radiation has decreased below a predetermined level, the state retention apparatus becomes disenabled and the flip-flop operates in its normal manner.

It is one object of the invention, therefore, to provide an improved state retention apparatus preventing radiation-induced errors signals from changing the logic state of a flip-flop.

It is another object of the invention to provide an improved state retention apparatus which retains the logic state of a flip-flop until after the ionizing radiation has decreased below a predetermined level.

It is yet another object of the invention to provide a state retention apparatus utilizing the photocurrents, induced by the ionizing radiation, to perform a switching function which protects the logic state of the flip-flop.

It is still another object of the invention to provide a state retention apparatus operating as a switching device during the effects of ionizing radiation.

These and other advantages, features and objects of the invention will become more apparent from the following description taken in connection with the illustrative embodiment in the accompanying drawings.

BRIEF DESCRIPTION OF THE DRAWINGS

FIG. 2b is the schematic diagram of the transistor of FIG. 2a;

FIG. 3a illustrates the impurity concentration of the diffusions of the transistor of FIG. 2a;

FIG. 3b illustrates the net doping concentrations along section AA of FIG. 2a;

FIG. 3c illustrates the net doping concentrations along section BB of FIG. 2a;

DESCRIPTION OF THE PREFERRED EMBODIMENTS

Figure 1:
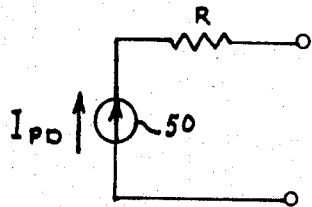
FIG. 1 is the equivalent circuit of a junction diode that is subject to radiation.

When a PN junction diode is irradiated by electromagnetic energy (e.g., light or gamma rays), hole electron pairs are created on both sides of the junction. Minority carriers diffuse across the PN junction, producing a photocurrent. The equivalent circuit for a photodiode is shown in FIG. 1. The charging effects and capacitance are neglected. This same equivalent circuit is valid for the photocurrent produced by gamma radiation. The photodiode equivalent circuit is comprised of a current generator 50 which produced a photocurrent $I_{PD}$ and a resistor R.

Figure 2B:
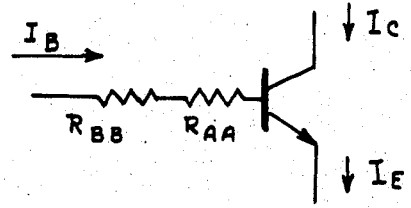
Figure 2A:
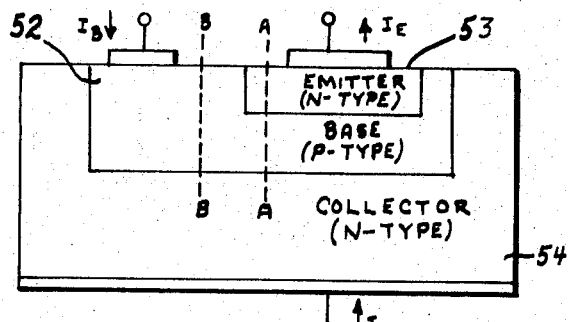
FIG. 2a is a cross section of an NPN transistor showing the diffusion of the emitter and base into the collector material.
Figure 3A:
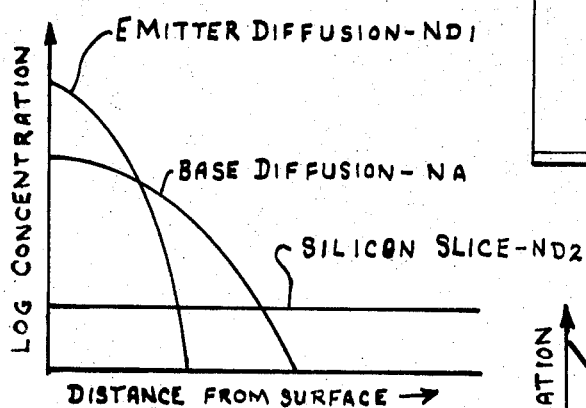
Figure 3B:
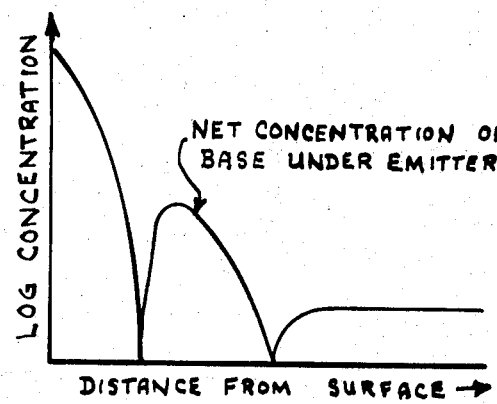
Figure 3C:
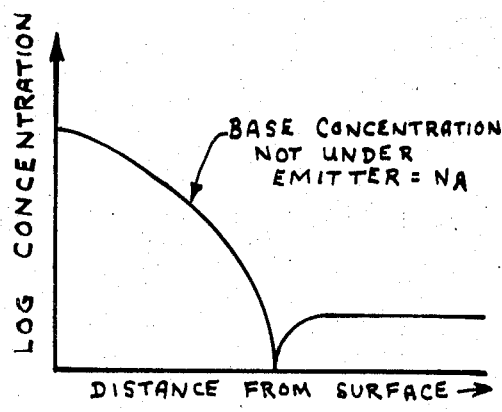

Turning now to FIG. 2a, there is shown the crosssection of an NPN transistor. The base region 52 is formed by diffusion of accepter impurities, $N_A$ into N-type silicon. The emitter region 53 is formed by diffusion of donor impurities, $N_{D1}$ into base region 52. The N-type silicon is the collector 54 of the NPN transistor that is formed. The base resistance under the active emitter (Section AA of FIG. 2) is formed by the difference in the concentrations of the base ($N_A$) and the emitter ($N_{D1}$) diffusions. Since the net concentration is relatively low, this component of transverse base resistance is high. The base resistance component which is not under the active emitter (Section BB of FIG. 2) is formed by difference in concentrations of base diffusion and the doping of the starting slice as shown in FIG. 3c. Since the net donor concentration is higher, this component of transverse base resistance is lower than that under the emitter. Values of these resistance components or their ratio can be varied by adjusting the concentrations and depths of the diffusions.

Figure 4A:
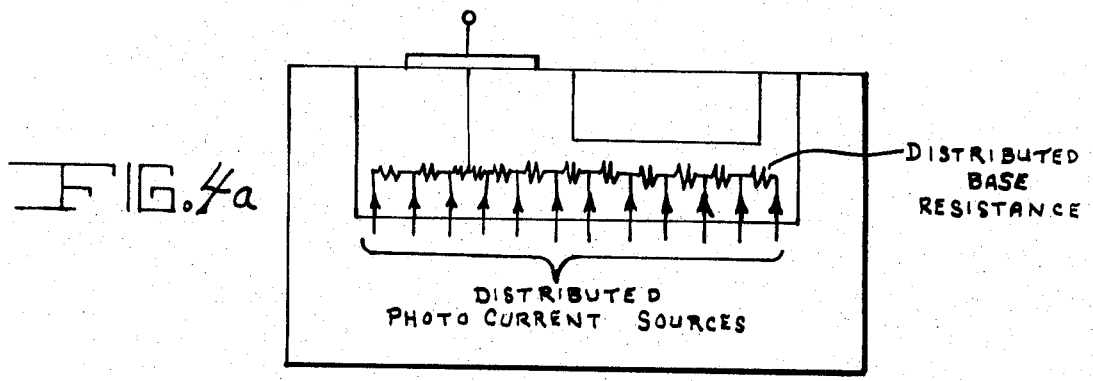
FIG. 4a is a physical representation of the distributed network for the photocurrent sources and the traverse base resistance of the collector-base junction.
Figure 4B:
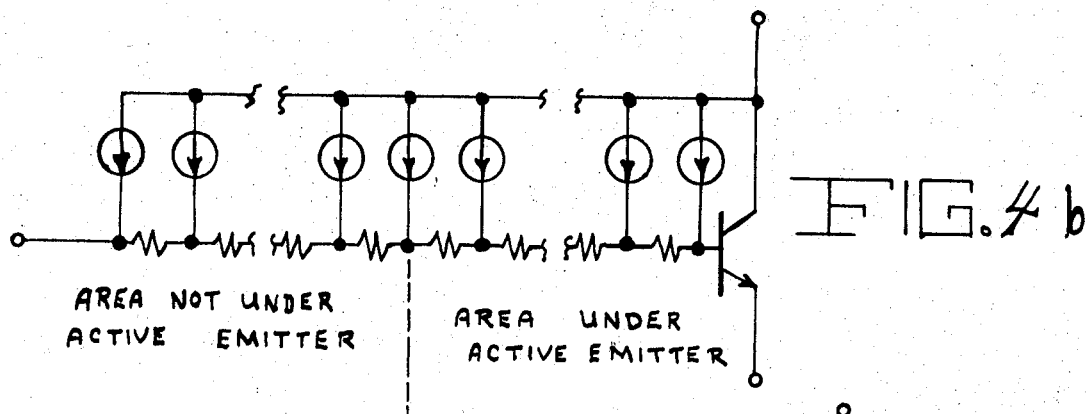
FIG. 4b is the equivalent circuit of FIG. 4a showing the active and inactive areas under the emitter.
Figure 4C:
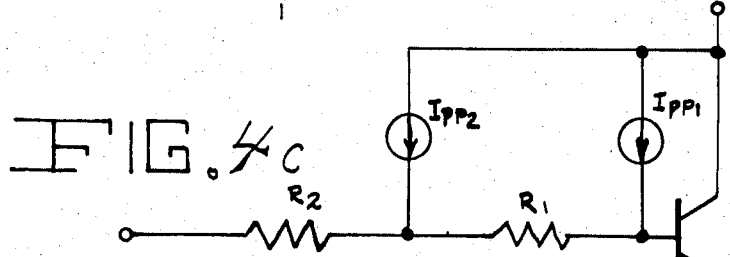
FIG. 4c is an approximation of the equivalent circuit of FIG. 4b.

Photocurrents and base resistance for the collector base junction of a transistor form a distributed network as shown in FIG. 4a and 4b. This can be approximated by two current generators and two base resistors as shown in FIG. 4c.

Figure 5:
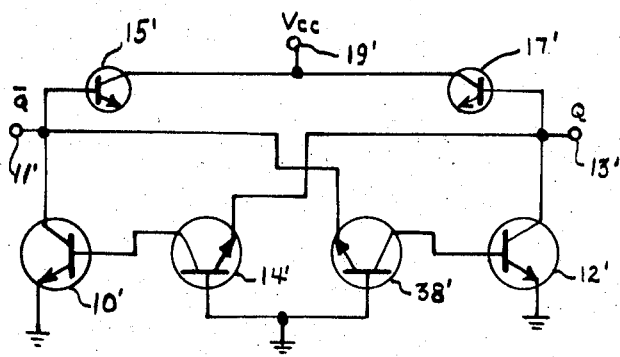
FIG. 5 is schematic diagram of the state retention circuit for a radiation hardened flip-flop; and, FIG. 6 is the equivalent circuit of FIG. 5 during radiation illumination.
Figure 6:
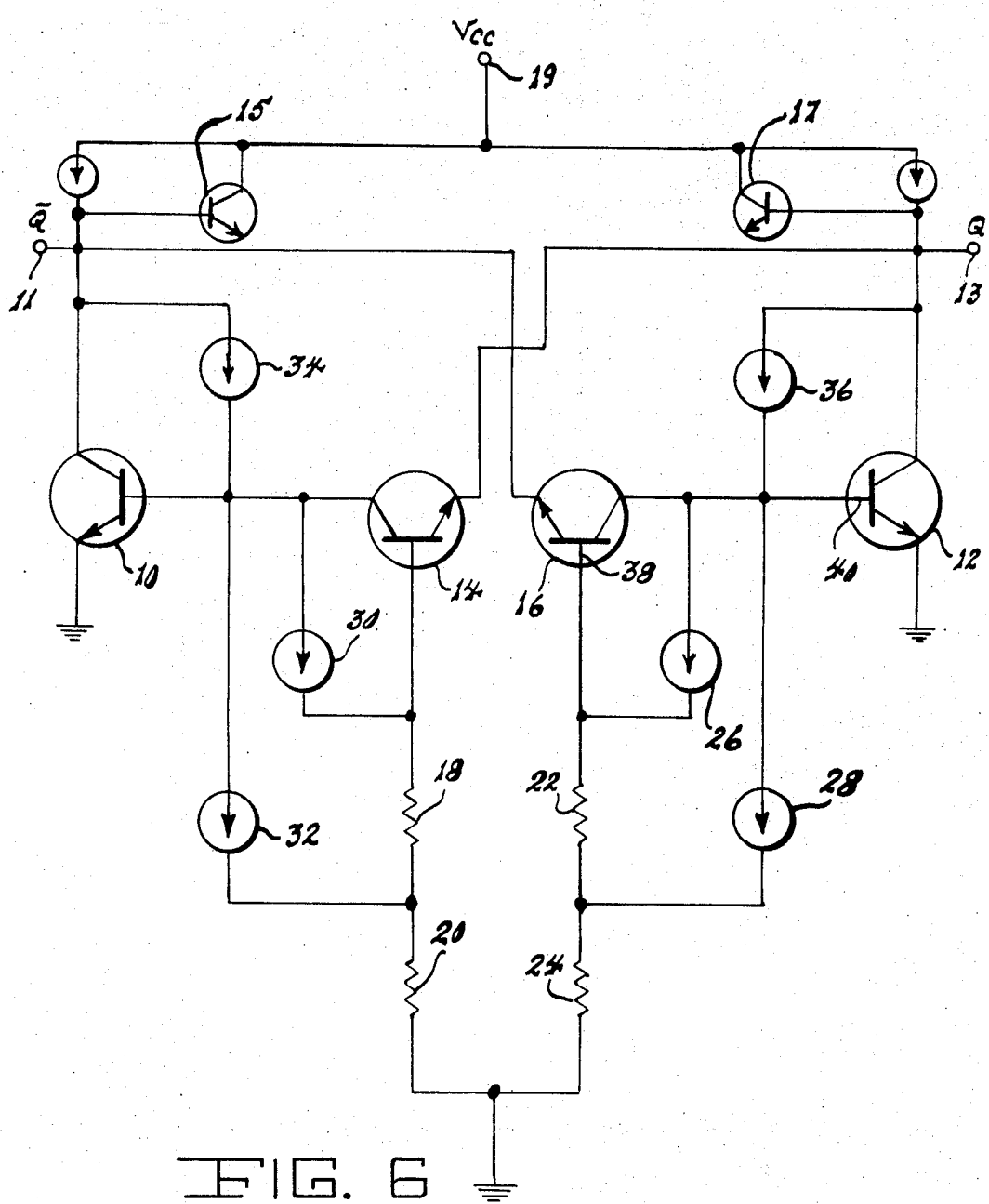

The state retention circuit for a radiation hardened flip-flop is shown in FIG. 5. The terminals 11', 13' and the transistors 10', 12' are part of the radiation hardened J-K flip-flop which is not shown. The circuit in FIG. 5 is shown prior to being subjected to radiation illumination. The equivalent circuit of the state retention circuit during radiation illumination is shown in FIG. 6. For comparison purposes, the equivalent components in FIG. 5 and 6 bear the same numeral but the components in FIG. 5 are primed so as not to cause any confusion.

Referring now to FIG. 6, the state retention apparatus utilizes the output transistors 10, 12 of a basic J-K flip-flop (not shown) in conjunction with two switching transistors, 14, 16 to protect the logic state of the flip-flop from the adverse effects of transient gamma radiation ionizing pulses. It should be noted that although the present invention will be described in terms of a state retention circuit for a basic J-K flip-flop that the inventive concept as herein described will also be applicable to the Set-Reset flip-flop. Output terminals 11, 13 are the normal and complementary output terminals of the J-K flip-flop (not shown). The power supply voltage V$cc$ is applied at terminal 19. The compensation current which is supplied from the power supply V$cc$ to the J and K outputs of the flip-flop is applied through the collector base junctions of transistors 15, 17. Transistors 15, 17 represent a portion of the internal circuitry of the J-K flip-flop. A silicon N-P-N transistor may be of the type utilized for transistors 14, 16. Transistors 14 and 16 are cross-coupled between the two output transistors 10, 12 to provide the state retention or holding feature. The resistors 18, 20, 22, 24 are small resistors which may be the ohmic base resistances of the transistors 14, 16, respectively when subjected to radiation illumination. Their value may be controlled such that resistor 22 is much greater than resistor 24 and resistor 18 is much greater than resistor 20. The current generators 26 and 28 are the equivalent circuit representations of the primary photocurrents which are produced in the active and inactive portions, respectively, of the collector-base junction of transistor 16 during radiation. The photocurrents which are generated by the equivalent generators 26, 28, are directly proportional to respective areas of the collector-base junctions and since the junction area of equivalent generator 26 is much smaller than the junction area of equivalent generator 28, the photocurrent of equivalent generator 26 will be proportionately smaller than the photocurrent of equivalent generator 28. Similarly, the current generators 30, 32 are the equivalent circuit representations of the primary photocurrents which are produced in the active and inactive portions, respectively, of the collector-base junction of transistor 14 during radiation. The photocurrent of equivalent generator 30 is much smaller than the photocurrent in equivalent generator 32. The current generators 34, 36 are the equivalent circuit representation of the primary photocurrents of transistors 10, 12, respectively, as determined by the collector-base junctions.

The operation of the circuit depends upon the level of the transient ionizing radiation pulse. The circuit is designed so that it will not be detrimentally affected by radiation levels of $10^{11}$ rad/sec (level 1) and will provide state retention at radiation levels of $10^{12}$ rad/sec (level 2). The state retention feature becomes operative between level 1 and level 2 where circuit compensation techniques fail.

The operation of the state retention apparatus will be described with respect to transistor 16 and its associated circuitry. When the J-K flip-flop is not being subjected to the effects of ionizing radiation, the photocurrent generators 28 and 26 are inactive and the base 38 of the transistor 16 is at ground potential. Since, during normal circuit operation, the output terminals 11, 13 are always above ground potential, the emitter and collector junctions of transistor 16 are reverse-biased and transistor 16 is inactive. When the J-K flip-flop is subjected to transient ionizing radiation ranging up to level 1, the voltage drops across resistors 22, 24 are negligible and transistor 16 does not function as a transistor. However, the photocurrents which are generated by generators 26, 28 compensate the photocurrent produced by generator 36. The photocurrents of transistor 16 are designed to overcompensate transistor 12 so that any mismatch in photocurrents cannot cause transistor 12 to turn on.

When the J-K flip-flop is subject to transient ionizing radiation at level 1 or greater, the base 38 of transistor 16 is biased above ground potential. When the transistor 12 is off and transistor 10 is on, transistor 16 is biased in the forward direction and saturated. Any current which might be supplied into the base 40 of transistor 12 is shunted to ground through the saturation resistance of transistors 16 and 10, thus preventing transistor 12 from turning on. When transistor 10 is off and transistor 12 is on, then transistor 16 is biased in the inverse direction and the high voltage at output terminal 11 provides a base current to transistor 12 through transistor 16, thereby turning transistor 12 on harder. If transistor 12 is initially on and transistor 10 is off prior to the radiation pulse, transistor 14 is heavily saturated and will remain in saturation longer than transistor 16. Thus, transistor 10 will be held off by transistor 14 until other transients die out. Transistor 12 will stay on until the transients die out since transistor 16 is out of saturation and transistor 12 is saturated. Thus, it may be seen that the information which is present at the output terminals 11, 13 during exposure to transient ionizing radiation of level 2 or greater cannot be changed or be adversely affected thereby. The above mode of operation of the state retention apparatus when the output levels of terminals 11 and 13 are reversed, applies equally well to the circuit operation of transistor 14 except for the appropriate change in designation for the related components.

Although the invention has been described with reference to a particular embodiment, it will be understood to those skilled in the art that the invention is capable of a variety of alternative embodiments within the spirit and scope of the appended claims.

I claim:

1. A state retention apparatus for a radiation hardened flip-flop for protecting logic circuitry from radiation-induced photocurrents comprising in combination:

a first switching means having a base, emitter and collector electrode, said collector and base forming a collector-base junction, said collector-base junction having an active portion and an inactive portion, the active portion of said collector-base junction providing a first photocurrent generator when subjected to the effects of transient ionizing radiation, said active portion of said base forming a first base resistor, the inactive portion of said collector-base junction providing a second photocurrent generator when subjected to the effects of a predetermined level of transient ionizing radiation, said inactive portion of said base forming a second base resistor, said first base resistance being connected between said first and second photocurrent generators, said second base resistance being connected between said first base resistance and ground, a second switching means having a base, emitter and collector electrode, said collector and base forming a collector-base junction, said collector-base junction having an active portion and an inactive portion, the active portion of said collector-base junction providing a third photocurrent generator when subjected to the effects of transient ionizing radiation, said active portion of said base forming a third base resistor, the inactive portion of said collector-base junction providing a fourth photocurrent generator when subjected to the effects of a predetermined level of transient ionizing radiation, said inactive portion of said base forming a fourth base resistor, said third base resistance connected between said third and fourth photocurrent generators, said fourth base resistance connected between said third base resistance and ground, said bases of said first and second switching means being connected to each other and ground, a first output transistor having a base, emitter and collector electrode, said emitter electrode connected to ground, said base electrode connected to said first switching means collector electrode, said collector electrode connected to said second switching means emitter electrode, the collector-base junction becoming a fifth photocurrent generator when subjected to the effects of a predetermined level of transient ionizing radiation.

a second output transistor having a base, emitter and collector electrode, said emitter electrode connected to ground, said base electrode connected to said second switching means collector electrode, said collector electrode connected to said first switching means emitter electrode, the collector-base junction becoming a sixth photocurrent generator when subjected to the effects of a predetermined level of transient ionizing radiation, a voltage supply terminal, a first impedance connected between said second output transistor collector electrode and said voltage supply terminal, and a second impedance connected between said first output transistor collector electrode and said voltage supply terminal.

2. A state retention apparatus as described in claim 1 wherein said predetermined level of transient ionizing radiation equals or exceeds $10^{12}$ rad/sec.

3. A state retention apparatus as described in claim 1 wherein said transient ionizing radiation comprises gamma radiation.

* * * * *